US010277484B2

(12) United States Patent
Tse et al.

(10) Patent No.: US 10,277,484 B2
(45) Date of Patent: Apr. 30, 2019

(54) SELF ORGANIZING NETWORK EVENT REPORTING

(71) Applicant: Telefonaktiebolaget L M Ericsson (publ), Stockholm (SE)

(72) Inventors: Edwin Tse, Montreal (CA); John Power, Kilmacthomas (IE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 288 days.

(21) Appl. No.: 13/951,836

(22) Filed: Jul. 26, 2013

(65) Prior Publication Data

US 2014/0047108 A1    Feb. 13, 2014

Related U.S. Application Data

(60) Provisional application No. 61/681,738, filed on Aug. 10, 2012.

(51) Int. Cl.
*H04L 12/26* (2006.01)
*H04L 12/24* (2006.01)
*H04W 84/18* (2009.01)

(52) U.S. Cl.
CPC ............ *H04L 43/06* (2013.01); *H04L 41/042* (2013.01); *H04L 41/06* (2013.01); *H04W 84/18* (2013.01)

(58) Field of Classification Search
CPC .......... H04L 43/06; H04L 43/04; H04L 43/08
USPC ........................................................ 709/224
See application file for complete search history.

(56) References Cited

U.S. PATENT DOCUMENTS

| | | | | |
|---|---|---|---|---|
| 6,732,189 | B1* | 5/2004 | Novaes | H04L 12/1836 709/238 |
| 6,832,341 | B1* | 12/2004 | Vijayan | 714/43 |
| 7,693,093 | B2* | 4/2010 | Riedel et al. | 370/260 |
| 2003/0204623 | A1* | 10/2003 | Cain | 709/241 |
| 2004/0157557 | A1* | 8/2004 | Barnett | H04W 36/30 455/41.2 |
| 2005/0055417 | A1* | 3/2005 | Reich | H04L 29/06 709/208 |
| 2008/0065764 | A1* | 3/2008 | Huang et al. | 709/224 |
| 2008/0270593 | A1* | 10/2008 | Hirsch | 709/224 |

(Continued)

OTHER PUBLICATIONS

Blum et al., "An Entity Maintenance and Connection Service for Sensor Networks", Proceeds of MobiSys 2003: The First International Conference on Mobile Systems, Applications, and Services, May 5, 2003, ACM, pp. 201-214.*

(Continued)

*Primary Examiner* — Nicholas R Taylor
*Assistant Examiner* — Meng Vang
(74) *Attorney, Agent, or Firm* — Ericsson Inc.

(57) ABSTRACT

A system and method for detecting, reporting and collecting information associated with network events is provided. A network element, such as an Event Reporter, detects an event that requires reporting to a manager of the network. The Event Reporter can determine if it is the lead responsible for reporting the event and forward it directly to the manager. Alternatively, it can forward the event report to a peer entity that has been designated as the lead. If the Event Reporter is the lead for the event, it can determine that it should relinquish the lead responsibility and initiate a hand-over of the lead role to a peer.

16 Claims, 9 Drawing Sheets

(56) References Cited

U.S. PATENT DOCUMENTS

2010/0299419 A1* 11/2010 Ramankutty et al. ........ 709/221
2013/0128786 A1* 5/2013 Sultan ............... H04W 52/0238
                                                          370/311

OTHER PUBLICATIONS

Proceedings of MobySys 2003: The First International Conference on Mobile Systems, Applications, and Services, ACM, 2 Penn Plaza, Suite 701, New York, USA, May 5, 2003.

Lars Christoph Schmelz et al.: "A coordination framework for self-organisation in LTE networks", Integrated Network Management (IM), 2011 IFIP/IEEE International Symposium ON, IEEE, May 23, 2011.

3rd Generation Partnership Project; Technical Specification Group Services and System Aspects; Telecommunication management; Pinciples and high level requirements (Release 11) 3GPP Standard; 3GPP TS 32.101, 3rd Generation Partnership Project (3GPP), Mobile Compentence Centre; 650, Route des Lucioles; F-06921 Sophia-Antipolis Cedex; France, vol. SA WG5, No. V11.0.0, Dec. 22, 2011.

Tobias Bandh et al.: "Policy-based coordination and management of SON functions", Integrated Network Management (IM), 2011 IFIP/IEEE International Symposium ON, IEEE, May 23, 2011.

Andrea Volpato, International Search Report, PCT/IB2013/056157, European Patent Office, Rijswijk, The Netherlands—2280, Apr. 2, 2014.

* cited by examiner

SELF ORGANIZING NETWORK EVENT REPORTING

CROSS-REFERENCE TO RELATED APPLICATION

This application claims the benefit of U.S. Provisional Application No. 61/681,738 filed on Aug. 10, 2012 which is incorporated herein by reference in its entirety.

TECHNICAL FIELD

This invention relates generally to systems and methods for event reporting in a managed network.

BACKGROUND

A network is a set of interconnected entities that can be dynamic in that it changes, evolves, adapts and decays over time. For example, new entities can be introduced, old entities can be removed, network topologies can change, links for interconnection can be down or replaced or enhanced, new versions of software can be activated, number of subscribers to network services grow, volume of network traffic fluctuates, etc.

In an example telecommunications network there are entities that serve as event reporters, event managers and event consumers. Event Reporters (ERs) are entities whose responsibilities are to detect the occurrences of network events and report them. Event Managers (EMs) are entities that collect the event reports from the ERs. An EM is part of the 3GPP defined Element Manager which provides a package of end-user functions for management of a set of closely related types of network elements. Event Consumers (ECs) are entities that retrieve and read event reports for up-to-date knowledge of the state or status of the managed network. FIG. 1 illustrates an example network topology, showing the relationship between ERs 54a-54n, an EM 52 and an EC 50 in terms of event reporting.

In a large network, there can be multiple realizations of each logical function. For example, multiple EMs, ECs and ERs can exist. One ER can send reports to multiple EMs and one EC can receive from multiple EMs for event reports. In addition, the number of ERs, EMs and ECs of a dynamic network can change over time. Furthermore, the number of ECs can be an order of magnitude more than that of EMs. The number of ERs is multiple orders of magnitude more than that of EMs.

In such a network, these logical functions can be implemented inside network nodes such as a Network Element (NE), a Domain Manager (DM) and a Network Management System (NMS) (also referred to as the Network Manager (NM)). A NE is a discrete telecommunications entity. Multiple logical ERs can be implemented inside a single physical NE. A DM provides element management functions and domain management functions for a sub-network. An EM can be implemented in a DM. An NMS provides a package of end-user functions with the responsibility for the management of a network, mainly as supported by the EM(s) but it may also involve direct access to the NEs. An NMS can include one or more ECs (for example, an NMS process that issues a command to retrieve currently active alarms is playing the role of an EC).

There are generally two categories of network events. One is serious in that it normally would require operator immediate attention. This category of event is reported by an Alarm report. The other is not serious in that it normally reports some normal network state or status changes. This category of event is reported by a Non-alarm report.

As defined by 3GPP TS 32.111-2 Fault Management, the contents of which are incorporated herein by reference, an Alarm report includes the following parameters: Target Entity Name, Event Type (such as "Processing Error Alarm"), Event Subtype, Probable Cause (such as "Broadcast Channel Failure"), and others.

As defined by 3GPP TS 32.662 Configuration Management, the contents of which are incorporated herein by reference, a Non-alarm report includes the following parameters: Target Entity Name, Event Type (such as "Object Creation"), and others.

The terminology "ER-kind" will be used in the present disclosure to denote an event reporter logical function that detects a specific "kind" or type of network event related to a specific entity and reports about it. For example, ER-kind1 can detect a network event "kind1" that would result in alarm reporting. Network event kind1 would correspond to a specific Event Type, a specific Event Subtype, a specific Probable Cause, and a specific target named entity. These are standard parameters in event reporting.

In another example, ER-kind73 can detect a network event kind73 that would result in non-alarm-type reporting and the network event would correspond to specific Event Type and specific target named entity characteristics.

When a network event of kind1 occurs, multiple ER-kind1 instances can detect it and report it. This conventional event reporting system results in multiple event reports, all carrying the same information, to be received and processed by the appropriate EMs and ECs. Such a large volume of duplicated event reports results in wasting communication bandwidth between an EM and ERs, wasting communication bandwidth between an EM and ECs, and wasting EM or EC processing times/cycles to filter, correlate and discard the redundant event information.

FIG. 2 illustrates a conventional event/alarm information flow topology for a large telecommunication network. NEs 64a-64g can include the functions of many ERs. The DM 62 performs the role of the EM. It collects alarms from multiple NEs 64a-64g via Interface-A 66. The NMS 60 performs the role of an EC. It collects alarms from the DM 62 via Interface-B 68. Note that there is only one exemplary NMS 60 shown in FIG. 2, but there could be multiple NMSs all receiving alarms from DM 62. In real telecommunication network, there could be thousands of such NEs reporting alarms to one DM. An international standard reference model for the NMS, DM, NE and their interfaces are described in 3GPP TS 32.101 Telecommunication management; Principles and high level requirements, the contents of which are incorporated herein by reference.

In the conventional network of FIG. 2, if X number of alarms are generated by the ERs of NEs 64a-64g, X number of alarms—regardless if they carry identical network fault occurrence—will be reported to the EM of DM 62. The NMS 60, supported by DM 62, will also receive X number of alarms.

Therefore, it would be desirable to provide a system and method that obviate or mitigate the above described problems.

SUMMARY

It is an object of the present invention to obviate or mitigate at least one disadvantage of the prior art.

In a first aspect of the present invention, there is provided a system and method for a network entity to determine if it is the lead for reporting an event, to determine if it wishes to remain as lead for reporting the event, optionally to initiate a hand-over of lead for reporting the event to a peer, and to send event reports to peer network entities and/or managers.

In a second aspect of the present invention, there is provided a method for coordinating event reporting in a self organizing network, performed by a network element. The method comprises detecting an event, the network element being responsible for reporting a network event type associated with the detected event to an element manager. The network element determines that it should relinquish responsibility for reporting the network event type. The network element initiates a hand-over of the responsibility for reporting the network event type to a peer network element.

In an embodiment of the second aspect, the step of initiating a hand-over of the responsibility for reporting the network event type includes waiting for a predetermined period of time. Responsive to receiving an event report corresponding to the detected event from a second network element during the predetermined period of time, the network element initiates a hand-over of the responsibility for reporting the network event type to the second network element. Alternatively, responsive to not receiving an event report corresponding to the detected event during the predetermined period of time, the network element transmits an event report to the element manager. The step of initiating a hand-over of the responsibility for reporting the network event type to the second network element can include transmitting an address of the element manager to the second network element.

In another embodiment, the step of detecting the event can include receiving an event report from the peer network element. The determination that the network element should relinquish responsibility for reporting the network event type can be responsive to determining that the network element has not previously detected the event reported by the peer network element. Responsive to determining that the network element has previously detected the event reported by the peer network element, the network element can transmit an acknowledgement message to the peer network element indicating that the network element retains responsibility for reporting the network event type. The acknowledgement message can include an address of the network element.

In another embodiment, the method includes the step of receiving a forwarding address associated with the network event type from the element manager. Responsive to determining that the forwarding address is an address of the element manager, the network element retains responsibility for reporting the network event type. Responsive to determining that the forwarding address is an address of the peer network element, forwarding a subsequent detected event, associated with the network event type, to the peer network element.

In a third aspect of the present invention, there is provided a network element comprising a communication interface, a processor, and a memory. The memory contains instructions executable by the processor whereby the network element is operative to detect an event, the network element being responsible for reporting a network event type associated with the detected event to an element manager. The network element determines that the network element should relinquish responsibility for reporting the network type event. The network element initiates a hand-over of the responsibility for reporting the network event type to a peer network element.

In another aspect of the present invention, there is provided a system and method for an element manager to receive an event report from a network element, to assign the role of lead responsible for reporting the event to one of a plurality of network elements and to communicate that assignment to the other of the plurality of network elements.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1:
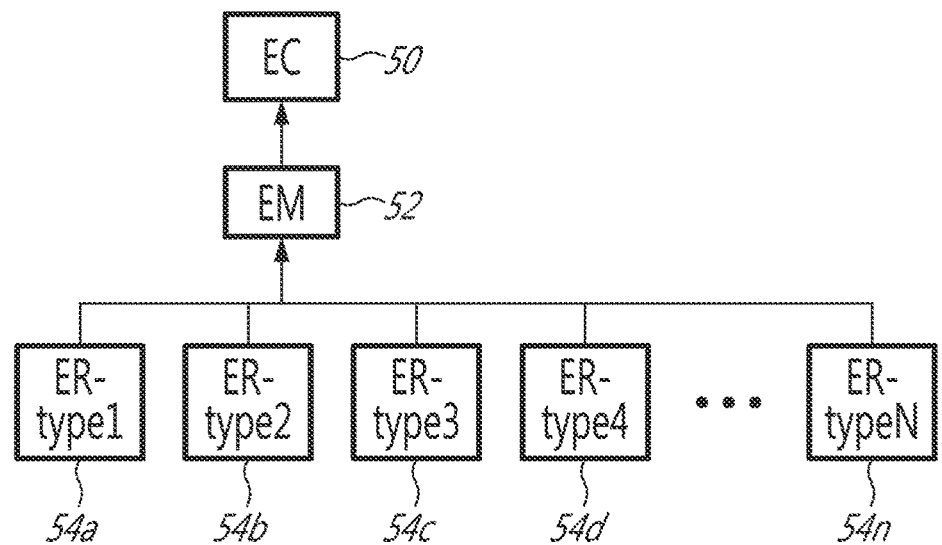
FIG. 1 is a network diagram.
Figure 2:
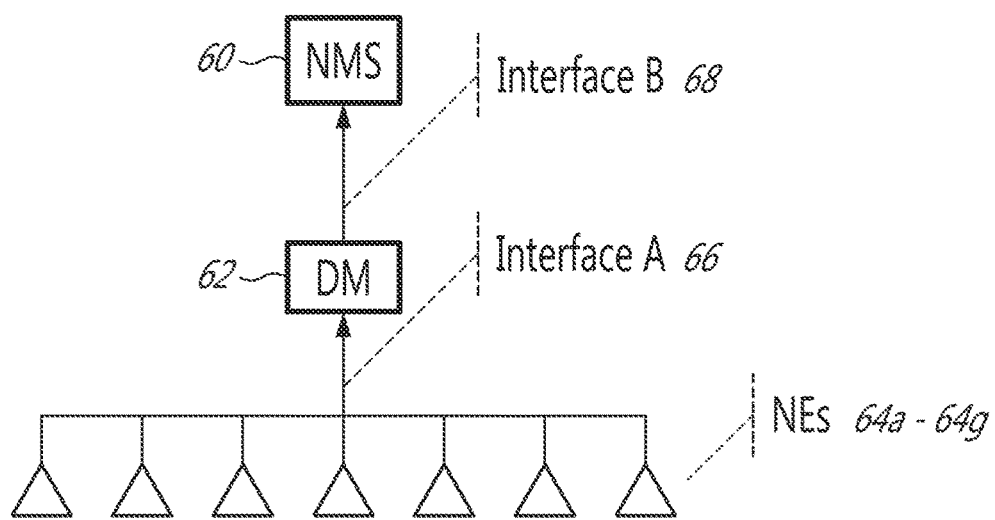
FIG. 2 is a topology of an event reporting system.

Reference may be made below to specific elements, numbered in accordance with the attached figures. The discussion below should be taken to be exemplary in nature, and not as limiting of the scope of the present invention. The scope of the present invention is defined in the claims, and should not be considered as limited by the implementation details described below, which as one skilled in the art will appreciate, can be modified by replacing elements with equivalent functional elements.

The present invention is directed to a system and method that supports and maintains a dynamic event reporting system topology. One of the goals is to allow ERs to discover if there is another ER that also detects and reports the same event occurrence. This discovery allows ERs to organize their event report flow dynamically, and without human operator's knowledge or intervention, into a new event reporting topology. A goal is to reduce the amount of event reports carrying identical information that are received by event report receivers such as ECs and EMs.

The present invention provides mechanisms for a particular ER to be the "lead" ER for a specific kind of network event. The term "lead-ER" will be used to describe an ER that has been assigned responsibility for reporting a kind of event to the EM. An ER (e.g. ER-kind92), upon detection of an event of kind92, will report the event to the EM if it is not aware of a "lead-ER" or if it, itself, is the lead-ER. Otherwise, the event is reported to the known lead-ER. The EM, when receiving a reported event, checks if the reported event has already been received. If yes, it ignores the reported event and informs the sender of the duplicate report of the presence of a lead-ER for that ER-kind by providing the lead-ER address.

Mechanisms are also provided for a lead-ER, upon detection of an event, to decide if it wants to be the lead-ER. There may be reliability, location or availability issues with a particular ER that may be unfavourable for the ER to continue as lead-ER for a kind of event.

If the lead-ER (e.g. ER-kind92), does not wish to be lead, it starts a timer. Before the timer expires, ER-kind92 may detect an occurrence of a kind92 event or receive a kind92 event report from one or more other ERs. It will respond to the other ERs by indicating it is not the lead-ER for kind92 by returning the EM address. This action would trigger the informed ER(s) to report the kind92 event directly to the EM. The ER-kind92 then waits further before sending the kind92 event report to the EM. The EM likely would have by then received one or more kind92 reported events and would respond to ER-kind92 with a new lead-ER address (i.e. the EM has assigned the lead-ER responsibility to another ER).

If the timer expires without detecting or receiving a kind92 event report, ER-kind92 must continue to be the lead-ER, and ER-kind92 sends the event to the EM.

This system and method helps to ensure that only one event report/alarm, indicating a particular event occurrence (e.g. a network fault occurrence), is reported to the EM and EC. It further allows for a lead-ER to decide to stop performing the role of lead-ER and can trigger the EM to assign another ER to be lead-ER for the kind As discussed herein, an ER-kind1 denotes a logical function that detects a specific kind of network event (e.g. kind1) of a specific target named entity and reports it. An ER that has been designated as the lead-ER for its kind (e.g. lead-ER-kind1) has the responsibility to report to the EM, a specific kind (e g kind1) of network event of a specific target named entity. A non-lead-ER may or may not be aware of the presence of a lead-ER. If it is aware, it sends the event report to lead-ER. If it is not aware of a lead-ER, it sends the report directly to the EM.

Figure 3:
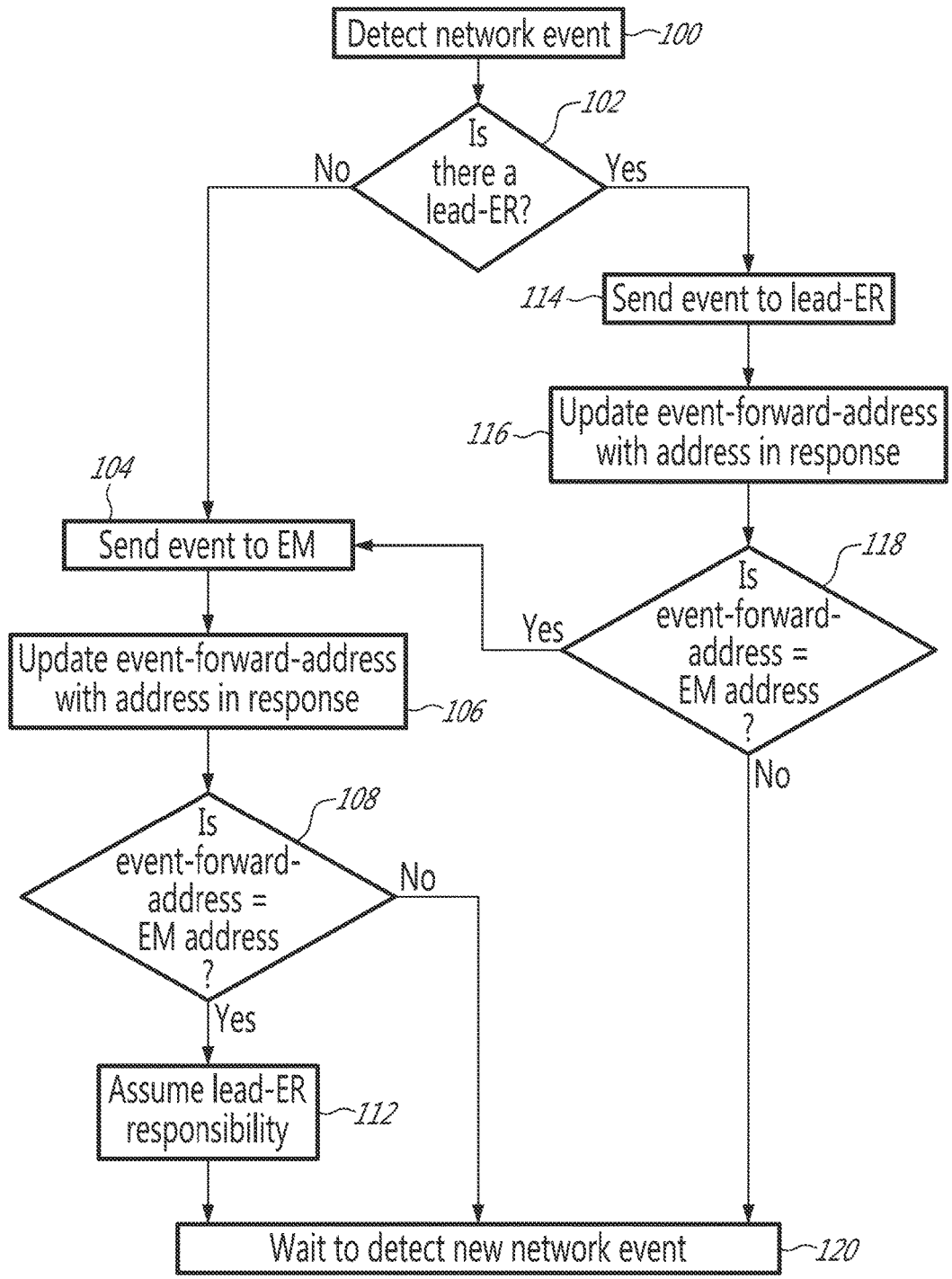
FIG. 3 is a logic flow diagram for an example Event Reporter.

Referring now to FIG. 3, the logic flow for an example ER is illustrated. It is assumed that the ER is configured to report on an occurrence of a certain kind of event. The kind of network event (e g kind1) is characterized by its Event Type, Event Subtype, Probable Cause and target named entity parameters. When the ER is first introduced to the network, or reset, it is not aware of a lead-ER for its specified kind of event. It is aware of an EM. By default, the ER loads and stores the address of the EM as the forwarding address for reporting the event kind (referred to as the event-forward-address).

When a network event of kind1 is detected (block 100) by an ER, the ER checks if it has knowledge of a lead-ER for event type kind1 (block 102). This can be performed by checking if the forward-to-address contains an address that is not the EM address. If there is no lead-ER known, the ER sends the event directly to the EM address (block 104). The EM will acknowledge and respond to the sending of the event report. The response from the EM will include one of two addresses: the address of a lead-ER or the address of the EM. The ER updates its stored event-forward-address with the address included in the response from the EM (block 106) and determines if it is the address of the EM or the address of a lead-ER (block 108). If the response carries the address of a lead-ER, the ER will send any subsequent event reports for kind1 to the lead-ER. If the response carries the address of the EM, the ER has become the lead-ER for subsequent event reporting of that kind (block 112).

When the ER does have knowledge of a lead-ER, it will send the event report to the lead-ER address (block 114). The lead-ER will acknowledge and respond to the sending of the event report. In this response, the lead-ER will either confirm that it is the lead-ER for kind1 (by including the lead-ER address in the response), or indicate that it is not the lead-ER for kind1 (by including the EM address in the response) and that the event report should be sent to the EM. The ER updates its stored event-forward-address with the address included in the response from the lead-ER (block 116). If the updated event-forward-address is determined to be the address of the EM (block 118), the ER sends the event to the EM (block 104). Otherwise, the ER waits to detect a new network event (block 120).

Figure 4A:
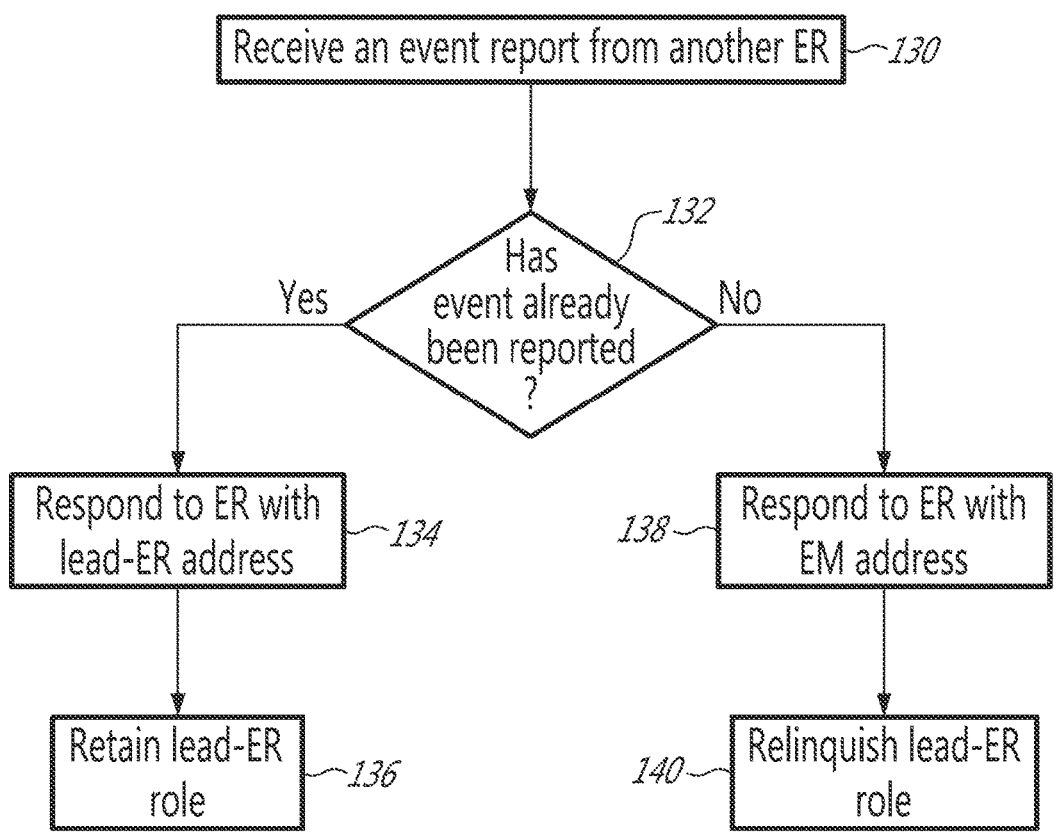
FIG. 4A is a logic flow diagram for an example lead-Event Reporter.
Figure 4B:
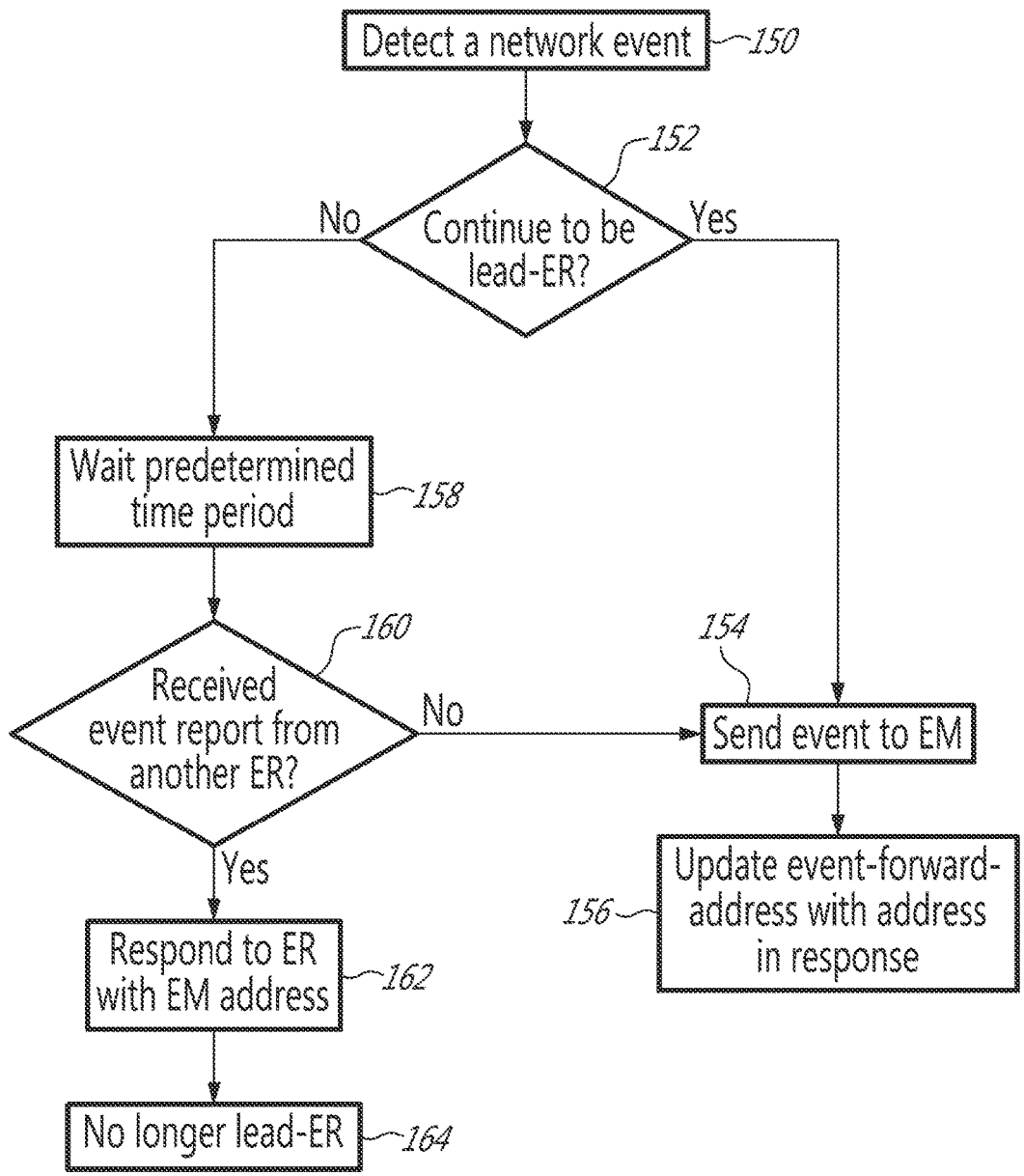
FIG. 4B is a logic flow diagram for an example lead-Event Reporter.

Referring now to FIGS. 4A and 4B, the logic flow for an ER that has been designated as lead-ER is illustrated. It is assumed that the ER has previously reported an event to the EM and the EM has confirmed that the ER is the lead-ER. There are two related scenarios to consider for a lead-ER, the case when the lead-ER receives an event report from another ER (FIG. 4A) and the case when the lead-ER is first to detect a network event (FIG. 4B).

FIG. 4A begins when the lead-ER receives an event report from another ER (block 130). The lead-ER first determines if it has already reported the event to the EM (block 132). If yes, it responds to the reporting ER with its own lead-ER address to confirm that it is, in fact, still the lead-ER for the event (block 134). The lead-ER continues to retain the lead-ER role (block 136). If the lead-ER has not already reported the event, the lead-ER responds to the reporting ER with the address of the EM (block 138). This is the triggering of handing over the role of lead-ER to the reporting ER, as the ER that first detects an event can be assumed to be the most reliable choice for the role of lead-ER. The initial lead-ER has now relinquished, and no longer holds the lead-ER responsibility for this event type (block 140).

FIG. 4B illustrates the scenario where the lead-ER is the first to detect a network event (block 150). The lead-ER must first determine if it wishes to continue being the lead-ER (block 152). Each ER can be configured on an individual or a network-wide basis with a set of business and/or technical rules to determine if it wishes to remain as lead-ER depending on the circumstance. In one embodiment, some ERs may be better suited to be the lead-ER based on device type, location, reliability, availability, etc. In other embodiments, the lead can be chosen at random and can also be rotated between potential lead-ERs at random. In some embodiments, both the EM and the ER help to select which ER will be the lead-ER.

Returning to FIG. 4B, if the lead-ER determines that it does wish to remain lead-ER, it reports the event to the EM (block 154). Similar to as discussed with respect to FIG. 3, the EM will respond to the event reporting with either the EM address (indicating that the lead-ER should remain lead-ER) or the address of another ER (indicating that the other ER is now the lead-ER). The lead-ER updates its event-forward-address with the address in the response (block 156). In an alternative embodiment, the EM can respond with the address of the lead-ER itself to indicate that it will remain in the role of lead-ER. In this alternative embodiment, the address of the EM will remain as the stored event-forward-address.

If the lead-ER determines that it should no longer continue to be the lead-ER (block 152), it will start a timer and wait for a predetermined time period (block 158) before further action. During the timeout period, the lead-ER waits to see if it receives a report of the same event from another ER in the network. At the expiration of the timer, the ER determines if it has received and stored an event report from another ER (block 160). If the lead-ER has not received an event report from another ER, the lead-ER can determine that there are no other candidates to become lead-ER and it must remain lead-ER. The event report is then sent to the EM (block 154). If an event report is received from at least one other ER prior to the expiration of the timer, the report and the ER address are stored. Upon expiration of the timer, the lead-ER is aware that it is not alone in reporting the network event and therefore, it can give up the role of lead-ER. The lead-ER will respond to any ERs that have reported with the EM address (block 162) to indicate that it is no longer the lead-ER responsible for reporting the event kind (block 164). The reporting ER, or ERs, will subsequently report the event to the EM and one will be designated as the new lead-ER.

Figure 5:
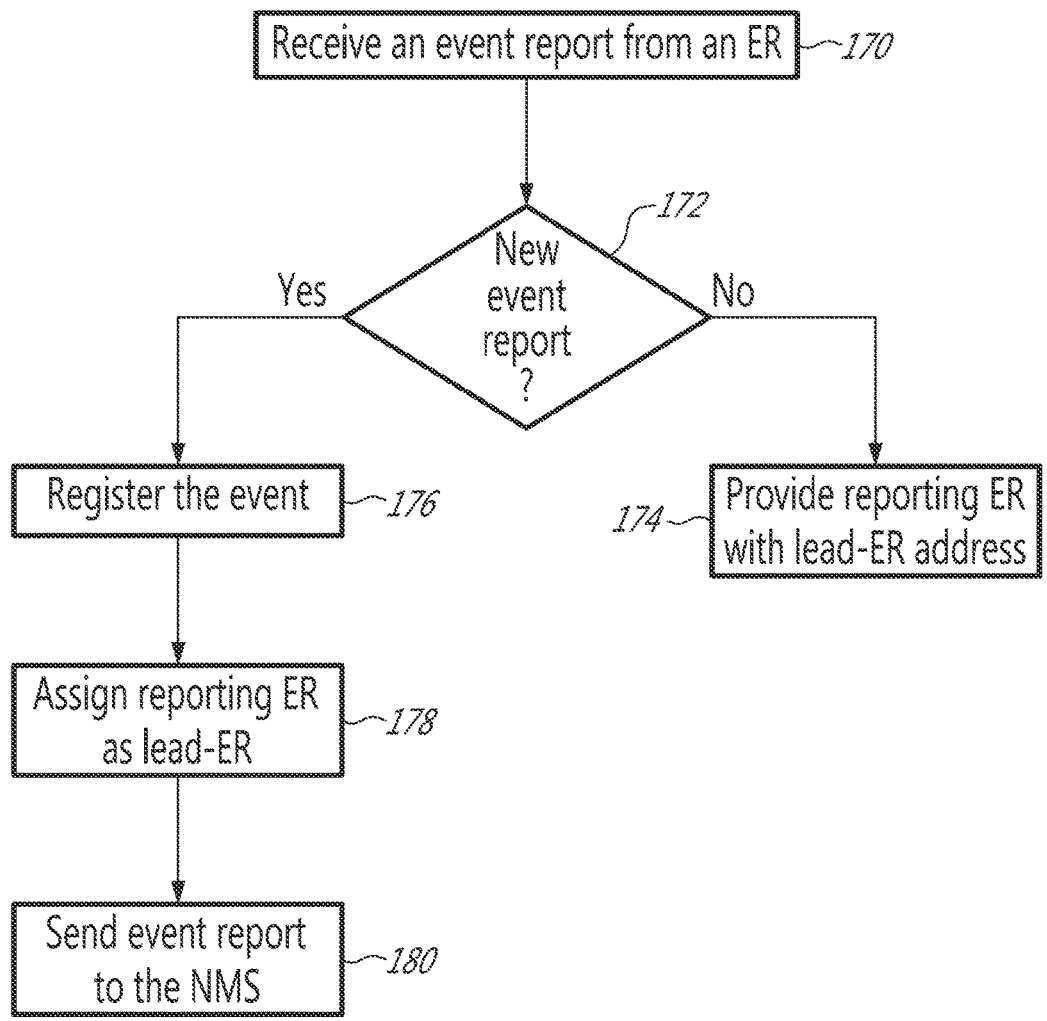
FIG. 5 is a logic flow diagram for an example Event Manager.

Referring now to FIG. 5, the logic flow for an EM is illustrated. The process begins with the EM waiting to receive an event report from an ER. When an event report is received (block 170), the EM determines if this is a new event report or one that the EM is already aware of (i.e. it has already received a report on the particular event from another ER) (block 172).

If the event report is not new, the EM will have already received a report on the event and will have assigned a lead-ER. The EM responds to the reporting ER with the address of the lead-ER to indicate the existence and identity of the lead-ER (block 174).

If the event report is new, the EM will register and store the event (block 176). The EM assigns the reporting ER as the lead-ER and acknowledges the reporting by responding with the EM address (block 178). The EM will store the address of the reporting ER as the lead-ER. The EM can then forward the registered event to any EC or the NMS interested in receiving the report (block 180).

Figure 6:
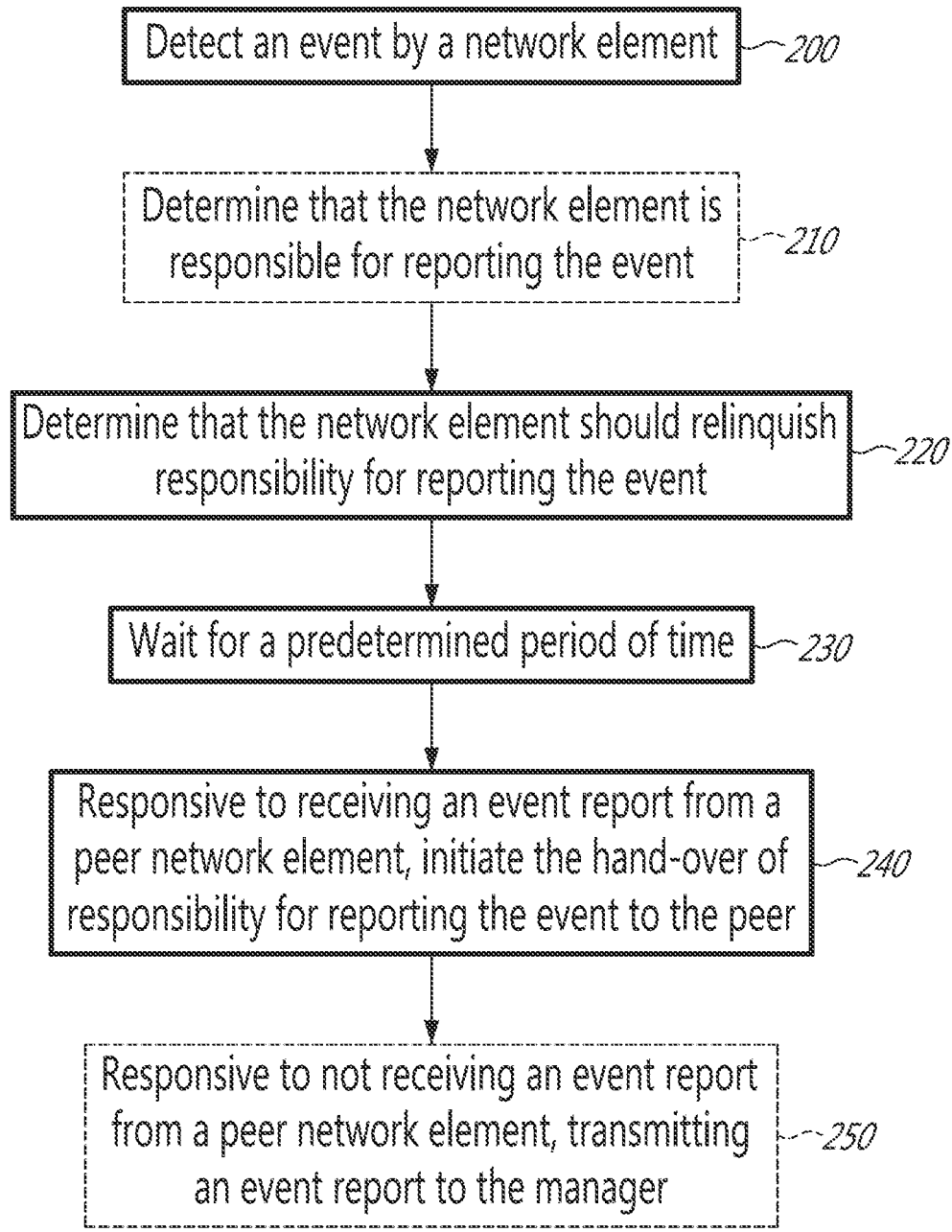
FIG. 6 is a flow chart illustrating an embodiment of the present invention.

FIG. 6 is a flow chart illustrating an embodiment of the present invention. The process begins by a network element detecting an event (step 200). The event can correspond to a type of network event that is to be reported either directly to an element manager or to a peer network element that is responsible for reporting to the element manager. The network element can receive a forwarding address associated with the network event type from the element manager. Alternatively, the forwarding address can be stored in the network element by default.

The network element can determine that it is the lead responsible for reporting the detected event (step 210). The network entity determines that it should relinquish the lead responsibility for reporting the event (step 220). In response to determining that it should relinquish the responsibility for reporting the event type, the network element initiates a hand-over of the event reporting role. The network element sets a timer and waits for a predetermined period of time (step 230). Following the expiration of the period of time, the network entity determines if it has received an event report, corresponding to the detected event, from any of its peer network elements. In response to receiving a corresponding event report during the timeout period from a peer, the network element initiates a hand-over of the lead responsibility for reporting the event type to the peer network element (step 240). Initiating the hand-over of responsibility for reporting the event type can include transmitting the address of the element manager to the peer network element. In response to having not received any corresponding event report(s) from a peer, the network element retains the responsibility and can transmit an event report to the element manager (step 250).

Figure 7:
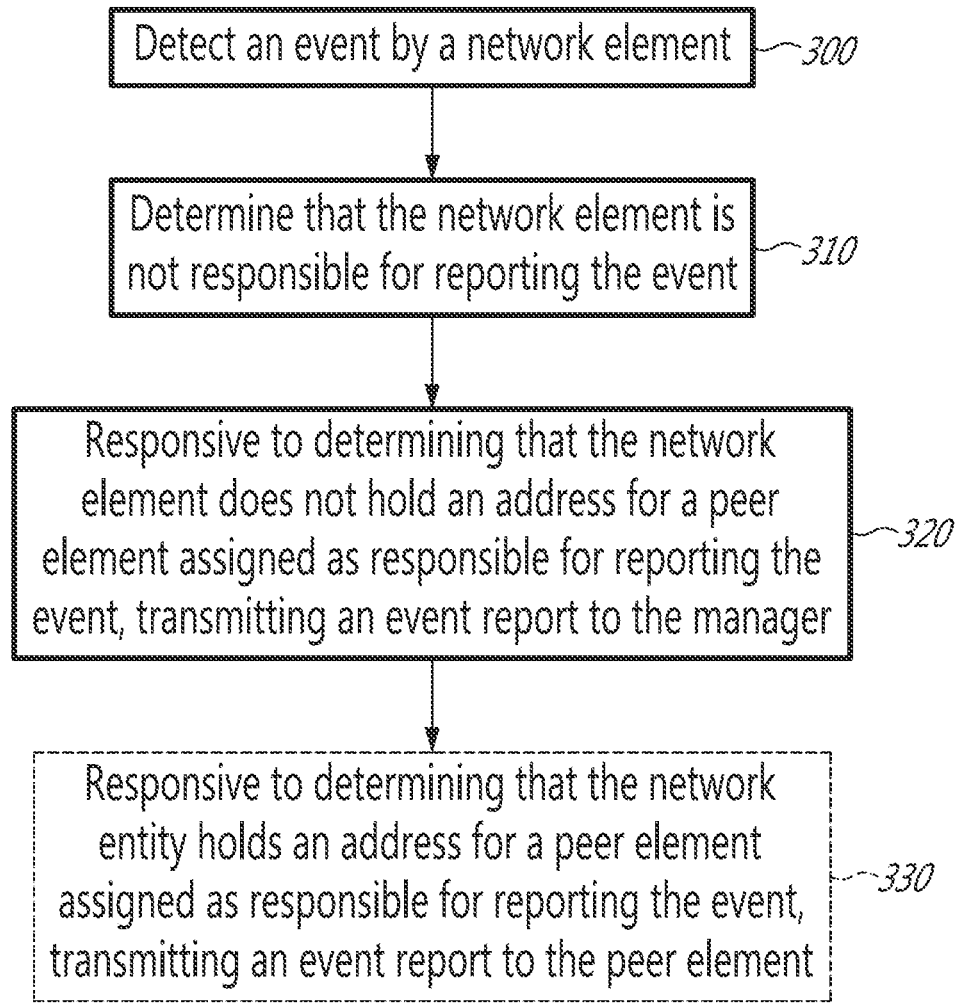
FIG. 7 is a flow chart illustrating another embodiment of the present invention.

FIG. 7 is a flow chart illustrating another embodiment of the present invention. The process begins by a network element detecting an event (step 300). The network element determines that it is not the lead responsible for reporting the detected event type to a manager (step 310). The network element determines if it has knowledge of, and holds, an address for a peer network element that is the lead responsible for reporting the detected event. In response to determining that the network element is not aware of a peer network element that is assigned as responsible for reporting the event, the network element transmits an event report to the manager (step 320). In response to determining that the network element does hold an address for a peer that is assigned as responsible for reporting the event, the network element can transmit an event report to the peer network element (step 330).

Figure 8:
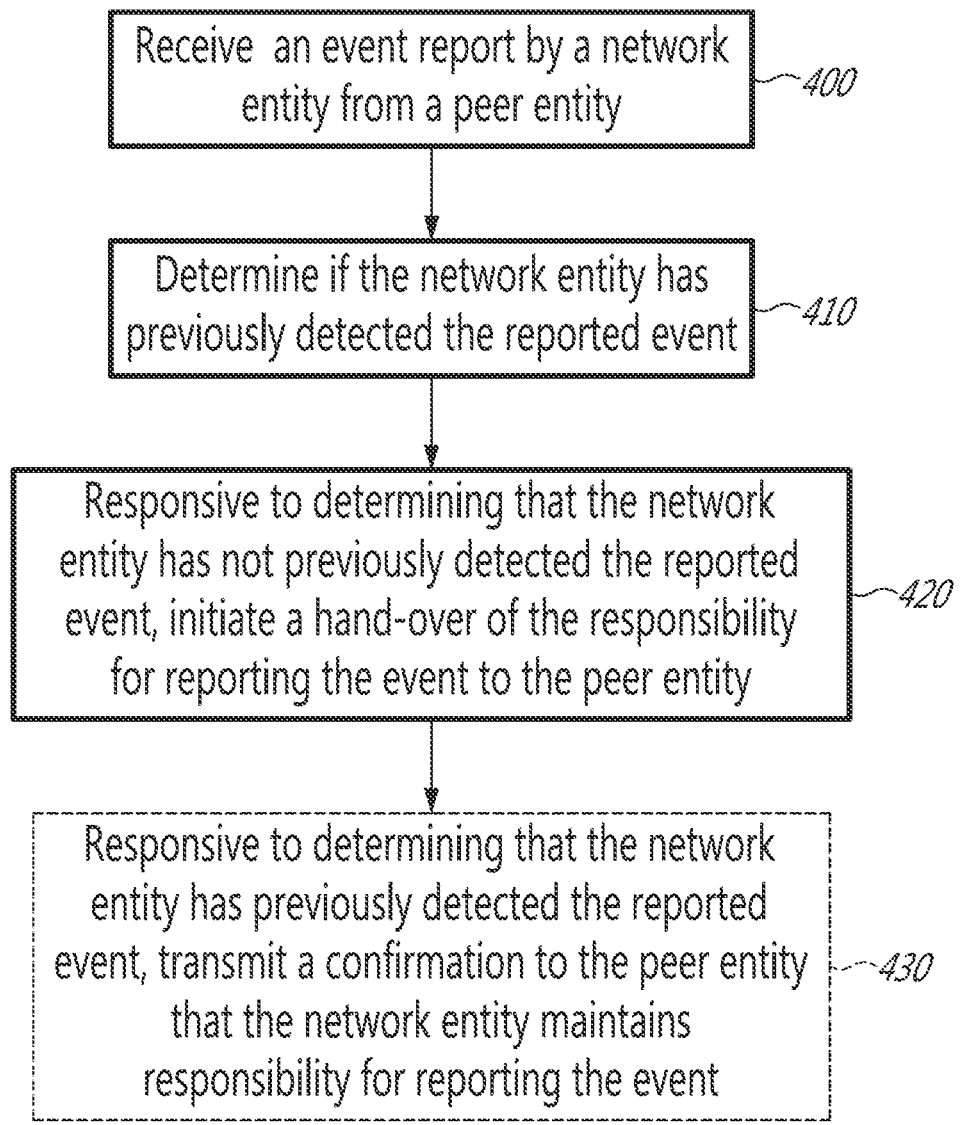
FIG. 8 is a flow chart illustrating another embodiment of the present invention.

FIG. 8 is a flow chart illustrating another embodiment of the present invention. The process begins by a network element receiving an event report from a peer network element (step 400). The network element determines if it has previously detected an event that corresponding to the received reported event (step 410). If the network element has not previously detected the reported event, it initiates a hand-over of the responsibility for reporting the network event type to the peer element (step 420). If the network element determines it has previously detected the reported event, it can transmit an acknowledgement message confirming to the peer element that the network entity retains responsibility for reporting the event type (step 430). The acknowledgement message can include the address of the network element.

Figure 9:
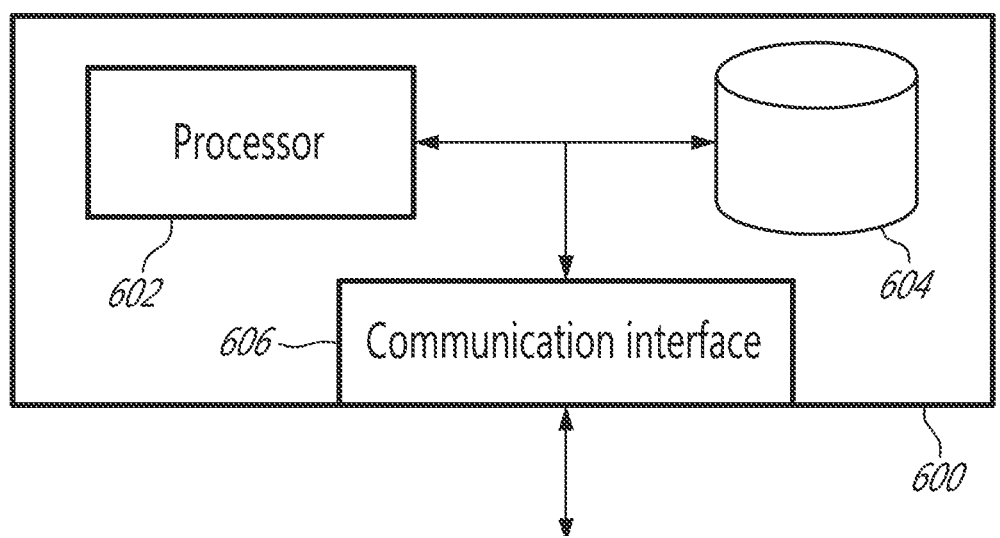
FIG. 9 is a block diagram illustrating an example node.

FIG. 9 is a block diagram illustrating an example network node 600 of the present invention which can perform the functionality of a network element or an element manager as described in the various embodiments of the present invention. Node 600 includes a processor 602, a memory or data repository 604 and a communication interface 606. The data repository 604 can be internal or external to node 600, but is accessible by the processor 602. The memory 604 contains instructions executable by the processor 602 whereby the network node 600 is operative to perform the embodiments of the present invention as described herein. Although the detailed requirements for the components, subassemblies, etc., may differ depending on whether the node 600 is part of a network element or an element manager, the performance requirements for each are well known.

The communication interface 606 is configured to detect network events as well as to send and receive event reports. The processor 602 is configured to determine if node 600 is the lead responsible for reporting a type of event associated with a detected event and/or a received event report. The processor 602 can determine if the node 600 should relinquish the responsibility for reporting the network event type. The processor 602 can determine if a hand-over of the responsibility for reporting the event should be initiated. The processor 602 can transmit event reports to an element manager or a peer network element through the communication interface 606. The memory 604 can store a forwarding address associated with the network event type, as received from the element manager. The memory 604 can store event reports received from peer nodes through the communication interface 606.

The present invention provides mechanisms for reducing the number of event reports sent to and received by a manager in a network. When multiple ERs emit multiple reports carrying the same information, only one report will be received by the EM and only one report will be received by each EC. The elimination of duplicate reports received by ECs and EMs ensures the report processing CPU cycles/times of ECs and EM will not be wasted. The elimination of duplicate reports received by ECs and EMs ensures that the bandwidth of the interfaces between network nodes will not be wasted.

An ER can be self-organizing in the sense that it does not require the operator's attention or direct input as to which ER is the lead-ER responsible for the event reporting. An ER can be initially configured with the EM address as the event-forward-address (e.g. it is not aware of any lead-ER). When the ER detects a first event, it sends the report to the EM address by default. The EM will respond to ER to indicate if it should become the lead for subsequent event detections. If the ER should not become the lead, the EM will provide the ER with the address of an already assigned lead-ER.

An example network has N ERs capable of detecting a specific kind of network event. In the prior art system, such a network can have N reports emitted from the N ERs. In the present invention, there may also be a scenario where N reports are emitted from the ERs. However, all N reports will be received by the EM only if a lead-ER has not yet been established, assigned or discovered. At most one report will be received by the EM if a lead-ER has been established and communicated. Therefore, the EM will not be flooded with all N reports.

In some embodiments, the lead-ER can potentially be flooded with N-1 alarms. However, an algorithm or a set of rules can be provided for a lead-ER to determine if it wants to retain the role of lead-ER for the future. Using such a decision, ERs can share the responsibility of lead-ER over time and therefore, flooding of the lead-ER is spread out over multiple ERs (e.g. network fault occurrence at time 1 floods ER-k; same network fault occurrence at time 2 floods ER-x, etc).

Embodiments of the invention may be represented as a software product stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention may also be stored on the machine-readable medium. Software running from the machine-readable medium may interface with circuitry to perform the described tasks.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method for coordinating event reporting in a self organizing network, performed by a network element, comprising:
   detecting an event by the network element by receiving an event report from a peer network element;
   determining that the network element has a lead event reporter role for reporting a network event type associated with the detected event, for a plurality of network elements, to an element manager;
   determining that the network element should relinquish the lead event reporter role for reporting the network event type responsive to determining that the network element has not previously detected the event reported by the peer network element;
   waiting for a predetermined period of time without reporting the detected event to the element manager; and
   responsive to receiving an event report corresponding to the detected event from a second network element during the predetermined period of time, initiating a hand-over of the lead event reporter role for reporting the network event type to the second network element.

2. The method of claim 1, further comprising, responsive to not receiving an event report corresponding to the detected event during the predetermined period of time, transmitting an event report to the element manager.

3. The method of claim 1, wherein initiating a hand-over of the lead event reporter role for reporting the network event type to the second network element includes transmitting an address of the element manager to the second network element.

4. The method of claim 1, further comprising, responsive to determining that the network element has previously detected the event reported by the peer network element, transmitting an acknowledgement message to the peer network element indicating that the network element retains the lead event reporter role for reporting the network event type.

5. The method of claim 4, wherein the acknowledgement message includes an address of the network element.

6. The method of claim 1, further comprising receiving a forwarding address associated with the network event type from the element manager.

7. The method of claim 6, wherein, responsive to determining that the forwarding address is an address of the element manager, the network element retains the lead event reporter role for reporting the network event type.

8. The method of claim 6, wherein, responsive to determining that the forwarding address is an address of a peer network element, forwarding a subsequent detected event, associated with the network event type, to the peer network element.

9. The method of claim 1, wherein the network element and the second network element are peer network elements in the self organizing network.

10. A network element comprising a communication interface, a processor, and a memory, the memory containing instructions executable by the processor whereby the network element is operative to:
   detect an event by receiving an event report from a peer network element;
   determine that the network element has a lead event reporter role for reporting a network event type associated with the detected event to an element manager;
   determine that the network element should relinquish the lead event reporter role for reporting the network type event responsive to determining that the network element has not previously detected the event reported by the peer network element;

wait for a predetermined period of time without reporting the detected event to the element manager; and responsive to receiving an event report corresponding to the detected event from a second network element during the predetermined period of time, initiate a hand-over of the lead event reporter role for reporting the network event type to the second network element.

11. The network element of claim 10, further operative to, responsive to not receiving an event report for the detected event during the predetermined period of time, transmitting an event report to the element manager.

12. The network element of claim 10, wherein initiating the hand-over of the lead event reporter role for reporting the network event type to the second network element includes transmitting an address of the element manager to the second network element.

13. The network element of claim 10, further comprising, responsive to determining that the network element has previously detected the event reported by the peer network element, transmitting, by the communication interface, an acknowledgement message to the peer network element indicating that the network element retains the lead event reporter role for reporting the network event type.

14. The network element of claim 13, wherein the acknowledgement message includes an address of the network element.

15. The network element of claim 10, further operative to receive, at the communication interface, a forwarding address associated with the network event type from the element manager.

16. The network element of claim 10, wherein the network element and the second network element are peer network elements in a self organizing network.

* * * * *